United States Patent [19]

Bourgeois

[11] Patent Number: 4,613,036
[45] Date of Patent: Sep. 23, 1986

[54] ROLLER CONVEYOR WITH IMPROVED COMB STRUCTURE

[76] Inventor: Ronald D. Bourgeois, 138 Ellison Park, Waltham, Mass. 02154

[21] Appl. No.: 720,708

[22] Filed: Apr. 8, 1985

Related U.S. Application Data

[63] Continuation-in-part of Ser. No. 600,536, Apr. 16, 1984.

[51] Int. Cl.$^4$ ............................................. B65G 47/74
[52] U.S. Cl. .................................. 198/633; 193/35 A
[58] Field of Search ............. 198/633, 634, 780, 789, 198/790, 853, 842, 791, 600, 781; 193/35 A, 35 SS, 35 R

[56] References Cited

U.S. PATENT DOCUMENTS

| | | | |
|---|---|---|---|
| 2,624,444 | 1/1953 | Casabona | 198/600 |
| 3,180,471 | 4/1965 | Schneider | 193/35 SS |
| 3,368,658 | 2/1968 | Eastham | 193/35 A |
| 4,067,428 | 1/1978 | Shuttleworth | 193/35 R |
| 4,264,005 | 4/1981 | Smock | 198/781 |
| 4,313,536 | 2/1982 | Fauth | 198/781 |

FOREIGN PATENT DOCUMENTS

| | | | |
|---|---|---|---|
| 1200259 | 6/1959 | France | 193/35 SS |
| 0093821 | 4/1959 | Norway | 193/35 R |

Primary Examiner—Joseph E. Valenza
Assistant Examiner—D. Glenn Dayoan
Attorney, Agent, or Firm—Joseph S. Iandiorio; William E Noonan

[57] ABSTRACT

A roller conveyor including: a plurality of spaced generally parallel roller rods; a number of rollers mounted on each of the rods and defining an upper surface for engaging conveyed objects; and a comb structure. The comb structure includes at least one comb element extending longitudinally along the conveyor transverse to the rods and being disposed between pairs of adjacent rollers on each of at least two successive rods. Each element has a plurality of recesses disposed in a lower longitudinal edge thereof for receiving a plurality of successive rods and a substantially level upper longitudinal surface extending upwardly above the rods and beneath the upper surface defined by the rollers.

12 Claims, 7 Drawing Figures

ROLLER CONVEYOR WITH IMPROVED COMB STRUCTURE

RELATED APPLICATION

This application is a continution-in-part of U.S. patent Ser. No. 600,536, filed Apr. 16, 1984.

FIELD OF INVENTION

This invention relates to a roller conveyor and to an improved comb element for use in such a conveyor.

BACKGROUND OF INVENTION

Conveyance of objects between successive rollers of a roller conveyor often is inadequate because the objects being conveyed tend to tilt or fall when confronting the void between successive rollers. This may result in blockages, stoppages or spilling. Conveyed objects are thus broken, scuffed, scratched and disrupted; planer objects may slip under a succeeding roller and jam the entire conveyor thereby necessitating time-consuming and costly delays to alleviate the back-up. Tilting, falling and blockages may also occur between successive conveyors, especially between a frictional conveyor and a transfer conveyor. Another common problem with conveyors is a tendency of the roller support rods to bend or droop under load, which further compounds the above problem.

SUMMARY OF INVENTION

It is therefore an object of this invention to provide a conveyor which virtually eliminates the tilting, falling, jamming, and other mishandling of objects conveyed between rollers of the same conveyor.

It is a further object of this invention to provide such a conveyor which also functions to eliminate such problems between successive conveyors.

It is a further object of this invention to provide an improved stabilizing system for a roller conveyor which may be quickly, simply and inexpensively installed in or removed from both new and existing roller conveyors.

It is a further object of this invention to provide a stabilizing system for a roller conveyor which may be operated to brake the conveyance of objects.

It is a further object of this invention to provide such a conveyor which has increased strength and rigidity in its roller support structure.

This invention results from the realization that a comb structure extending longitudinally beyond but not above the conveyor rollers and disposed interstitially of adjacent rollers is truly effective in properly preventing conveyed objects from being mishandled between rollers. This invention results from the further realization that an improved comb structure which has roller rod accommodating recesses in the bottom edge thereof may be quickly, easily and inexpensively mounted to both existing and new roller conveyors to provide enhanced and convenient stabilization for such conveyors.

This invention features a roller conveyor including a plurality of spaced generally parallel roller rods. A number of rollers are mounted on each of the rods and thereby define an upper surface for engaging conveyed objects. A comb structure includes at least one comb element which extends longitudinally along the conveyor transverse to the rods and is disposed between pairs of adjacent rollers on each of at least two successive rods. Each comb element has a plurality of recesses disposed in a lower longitudinal edge thereof for receiving a plurality of successive rods. Each comb element also includes a substantially level upper longitudinal edge extending upwardly above the rods and beneath the upper surface defined by the rollers.

In a preferred embodiment the comb element extends downwardly beneath the lower surfaces of the rollers and there is a comb element between each pair of adjacent rollers. The upper edges of the comb elements may extend beyond the end roller of the conveyor and the ends of the comb elements may be curved to conform generally to the ends of the neighboring conveyor. Preferably, the recess includes an enlarged section for receiving a roller rod and an entrance which is narrower than the diameter of the rod. The comb element may include resilient material which is momentarily expandable to widen the entrance of the recess for inserting and removing the roller rod. The upper edge of the comb element may include a slide surface for slidingly supporting conveyed objects which bear on it between the rollers.

The roller rods may be rotatively driven and the rollers may loosely frictionally engage the roller rods. Further provided may be means for selectively raising the comb elements to at least the level of the upper surface defined by the roller to brake items conveyed thereon.

This invention further features a stabilizing system for a roller conveyor which includes the comb structure as disclosed above.

DISCLOSURE OF PREFERRED EMBODIMENT

Other objects, features and advantages will occur from the following description of a preferred embodiment and the accompanying drawings in which.

Figure 1:
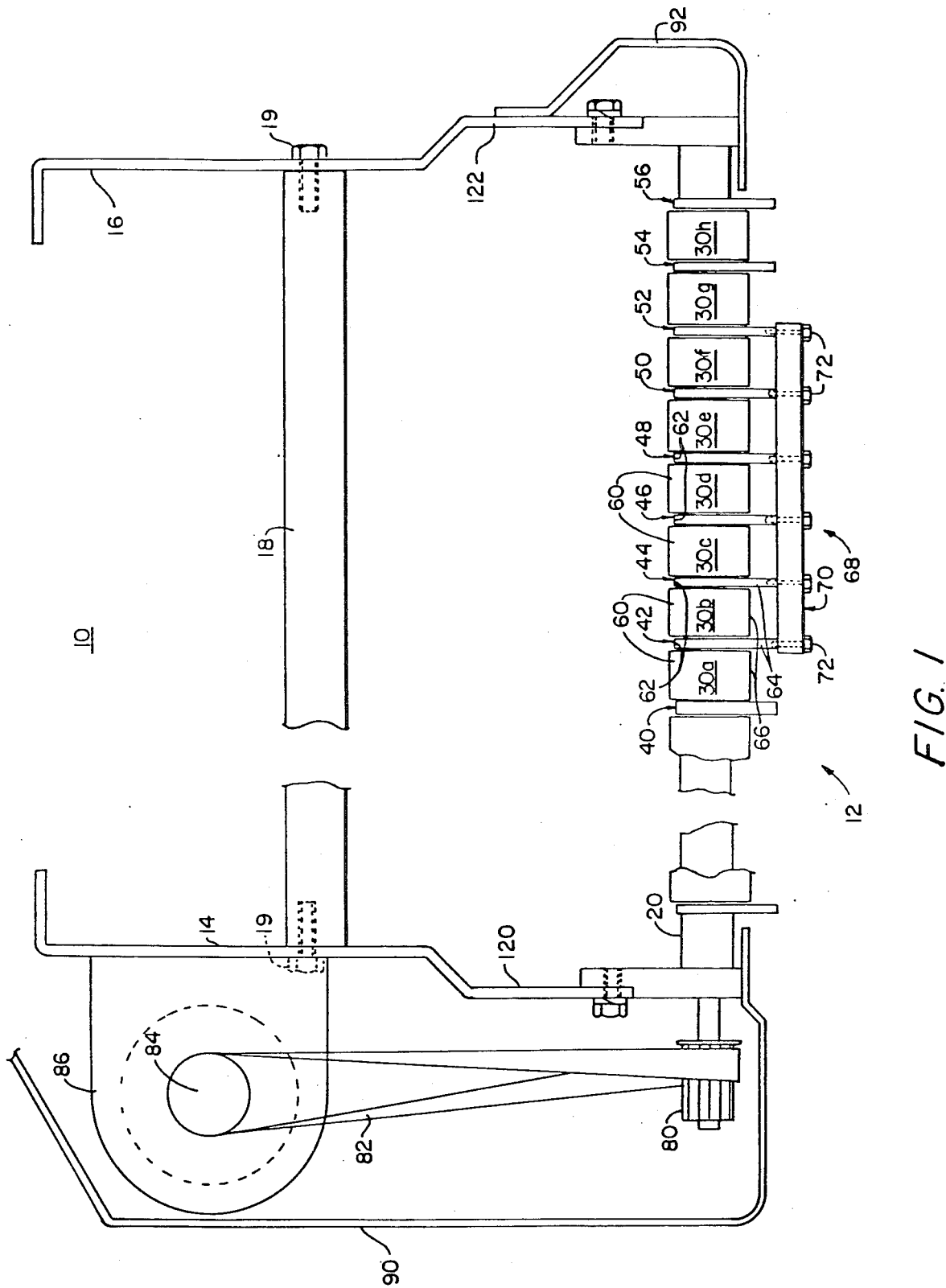
FIG. 1 is a front elevational view with portions broken away of a roller conveyor and comb structure according to this invention.

The invention may be accomplished using conventional conveyor frames and support structures which may be of metal, plastic or any other suitable material. The conveyor includes a plurality of parallel roller rods which are spaced from each other along the direction of conveyance. The roller rods are typically metal. There are a number of rollers axially mounted on each of the rods. The rollers too may be metal, or may be self-lubricating plastic such as nylon, Delryn or Teflon. The material depends to a great degree on a particular application of a specific conveyor; for example, conveyors used in the food industry often have to use stainless steel extensively throughout their structure. The roller rod may be fixed and the rollers mounted for rotation on it when the conveyor is a so-called dead conveyor, which utilizes gravity or the conveying inertia to move objects across it. More often the roller rod is driven to rotate and the rollers are either fixed to it or loosely, frictionally engage it, so that in either case the rollers may be driven by the roller rod.

There is a comb structure including at least one comb element which extends longitudinally along the conveyor transverse to the roller rods. Each comb element is disposed between pairs of adjacent rollers on each of at least two successive rods. Each element has a plurality of recesses disposed along a lower edge thereof. Each recess receives a respective one of a plurality of successive rods. The comb elements extend upwardly to just below the upper surface defined by the upper roller surface and may extend downwardly to well below the lower surfaces of the rollers. The comb elements may be positioned between selected pairs of the rollers or between every pair of rollers. The comb structure may also include some support means to connect at least some of the comb elements beneath the rollers to form a unitary truss and increase the rigidity of that section or of the entire roller conveyor.

Typically, the comb elements are composed of a resilient plastic material such as acetal-nylon. Each recess includes an enlarged section through which a roller rod is received and an entrance which is narrower than the diameter of the received rod. Because the element is resilient, it may be momentarily expanded to widen the entrance of the recess so that the roller rod may be inserted or removed (e.g., the comb elements may be readily snap fit onto or removed from the roller rods).

The upper edge of the comb elements typically includes slide surfaces for slidingly supporting conveyed objects which bear on them between the rollers. Means may be provided for selectively raising the comb elements so that the upper slide surface is raised above the upper surface defined by the rollers thereby braking objects conveyed thereon. At one or both ends of the conveyor the upper edges of the comb elements may extend beyond the end roller of the conveyor, and the ends may be curved to conform generally to the ends of the neighboring conveyor or conveyors.

There is shown in FIG. 1 a roller conveyor 10 including a comb structure 12 according to this invention. Conveyor 10 includes side walls 14 and 16 interconnected with cross brace 18 by bolts 19.

Figure 2:
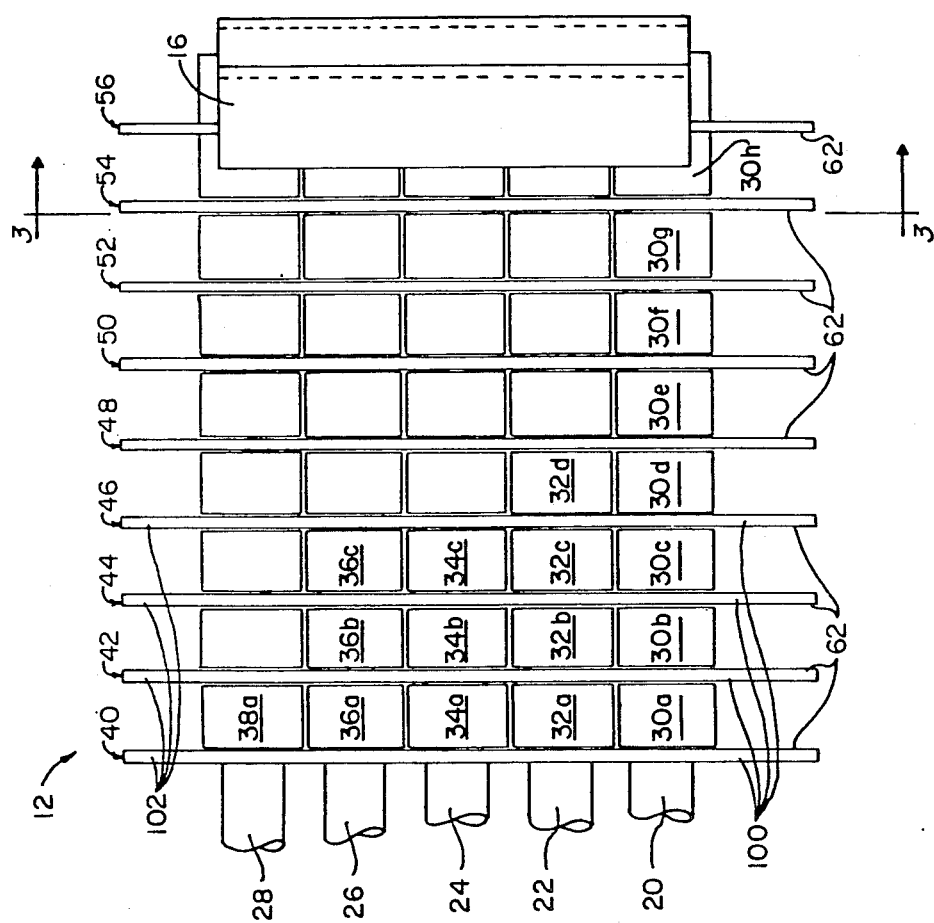
FIG. 2 is a planned view of the right-hand portion of the conveyor and comb elements of FIG. 1 with cross brace removed.

There are a plurality of roller rods 20, 22, 24, 26 and 28, FIG. 2, each of which carries a plurality of rollers 30a, b, c, d, e, f, g, h; 32a–h; 34a–h; 36a–h; 38a–h. Comb structure 12 includes a plurality of comb elements 40, 42, 44, 46, 48, 50, 52, 54, and 56. Each comb element extends upwardly above roller rod 20 but below the upper surface 60 of the rollers, FIG. 1. Each of the upper edges 62 of comb elements 40–56 includes sliding surfaces to facilitate the forward motion of objects which bear on them between the rollers. The lower portions 64 of comb elements 40–56 extend below the lower surface 66 of the rollers and may be joined together to form a unitary truss 68 by a support member 70 which is fastened by screws 72 or other suitable means to the bottom 64 of the comb elements. Although in FIG. 1 support 70 is shown as bridging only six comb elements, it may bridge all of the comb elements and for their entire length. Each roller rod 20–28, FIG. 2, includes on one end a splined shaft 80, FIG. 1, which engages with a splined belt 82, which is in turn driven by 90° drive shaft 84 of motor 86 mounted in the conventional fashion to side wall 14. Side guards 90, 92 protect the rotating ends of roller rods and the motor and belts.

Figure 3:
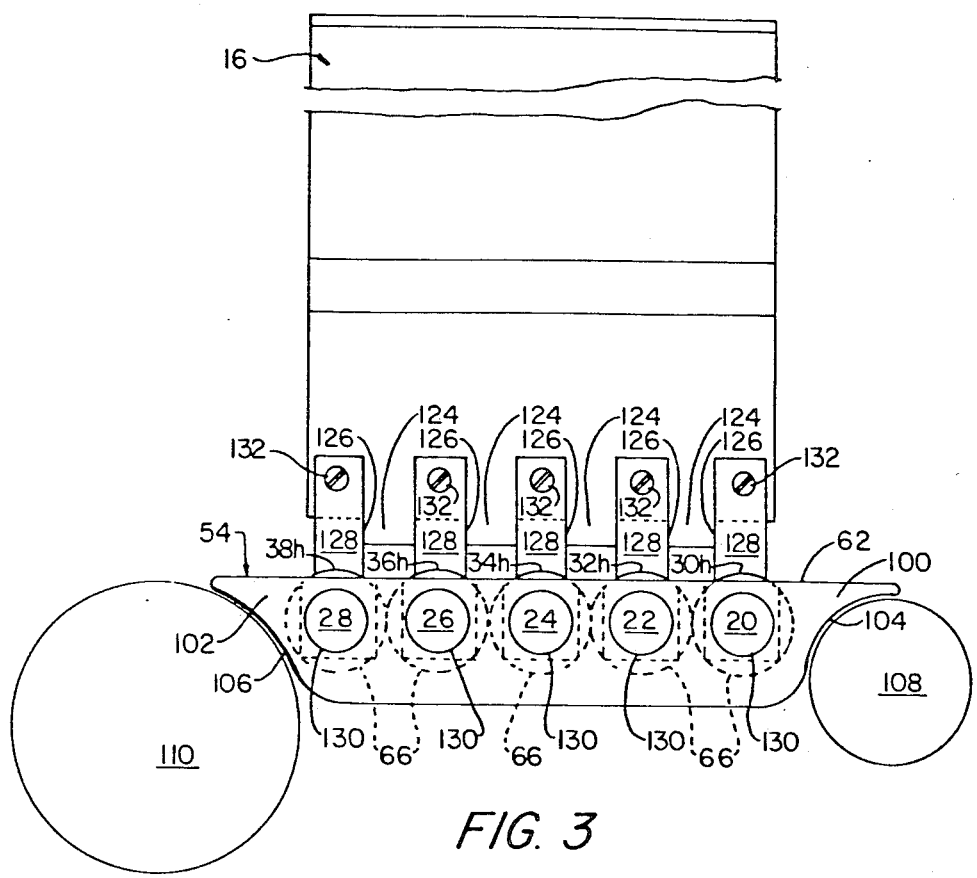
FIG. 3 is a side elevational view taken along line 3—3 of FIG. 2.

As shown in FIG. 3, the top edge 62 of comb elements 40–56 extends beyond the end rollers 30a–h and 38a–h on either end. These overhanging ends 100, 102 are curved as at 104 and 106 to conform to the interacting rollers 108, 110 of neighboring conveyors.

Figure 4:
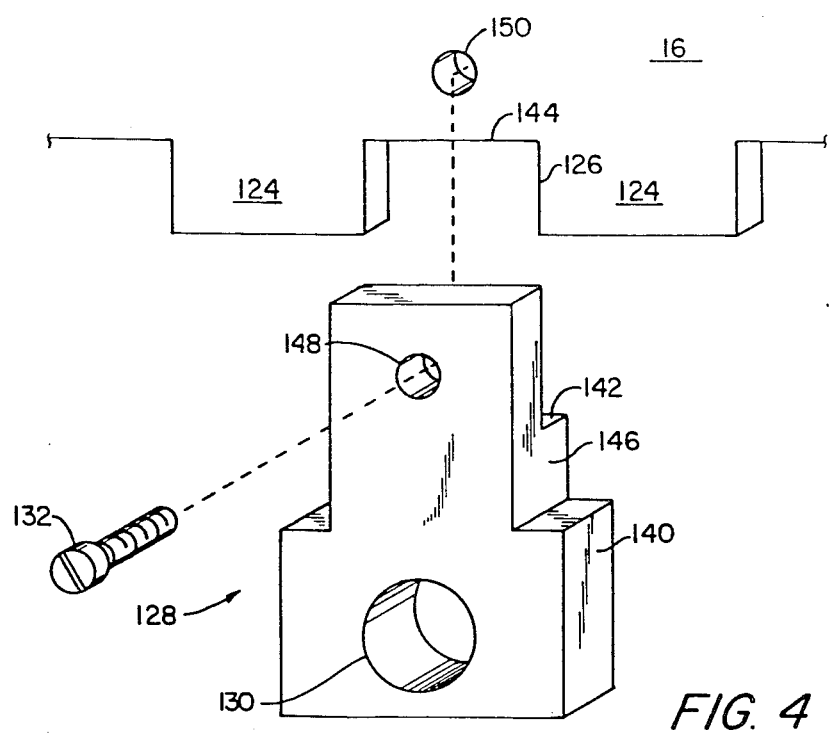
FIG. 4 is an enlarged axonometric view of the teeth and bushing support for the roller rods.

The lower end 120, 122 of side walls 14 and 16 contain an array of teeth 124 and interstitial slots 126 as shown in FIG. 3, which receive bushings 128 that carry roller rods 20–28 in bores 130. Bolts 132 mount bushings 128 to side walls 16. The construction of bushing 128 and its relationship to the teeth and slots of side wall 16 are shown more clearly in FIG. 4. Block 128 includes an enlarged lower portion 140 which contains bore 130 and a shoulder 142, which engages the top 144 of slot 126 when the upper portion 146 of bushing 128 is slid into the slot 126 between a pair of adjacent teeth 124, so that the clearance hole 148 in bushing 128 is aligned with the threaded hole 150 in side wall 16 to receive mounting bolt 132.

Figure 5:
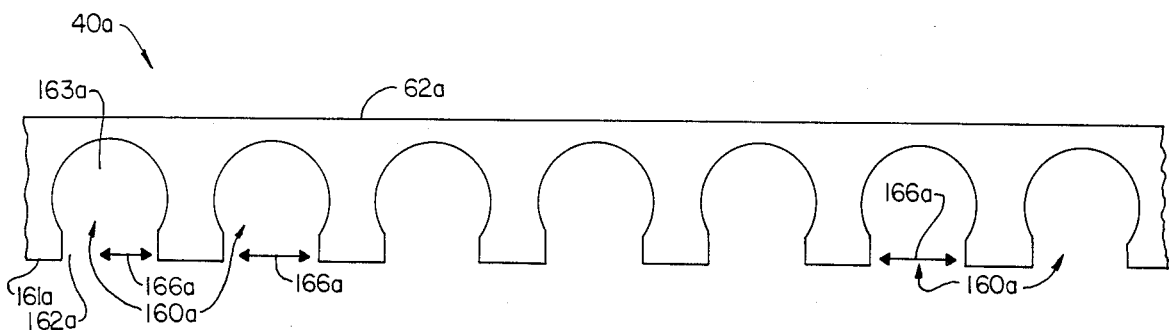
FIG. 5 is an elevational view of the improved comb element of this invention.
Figure 6:
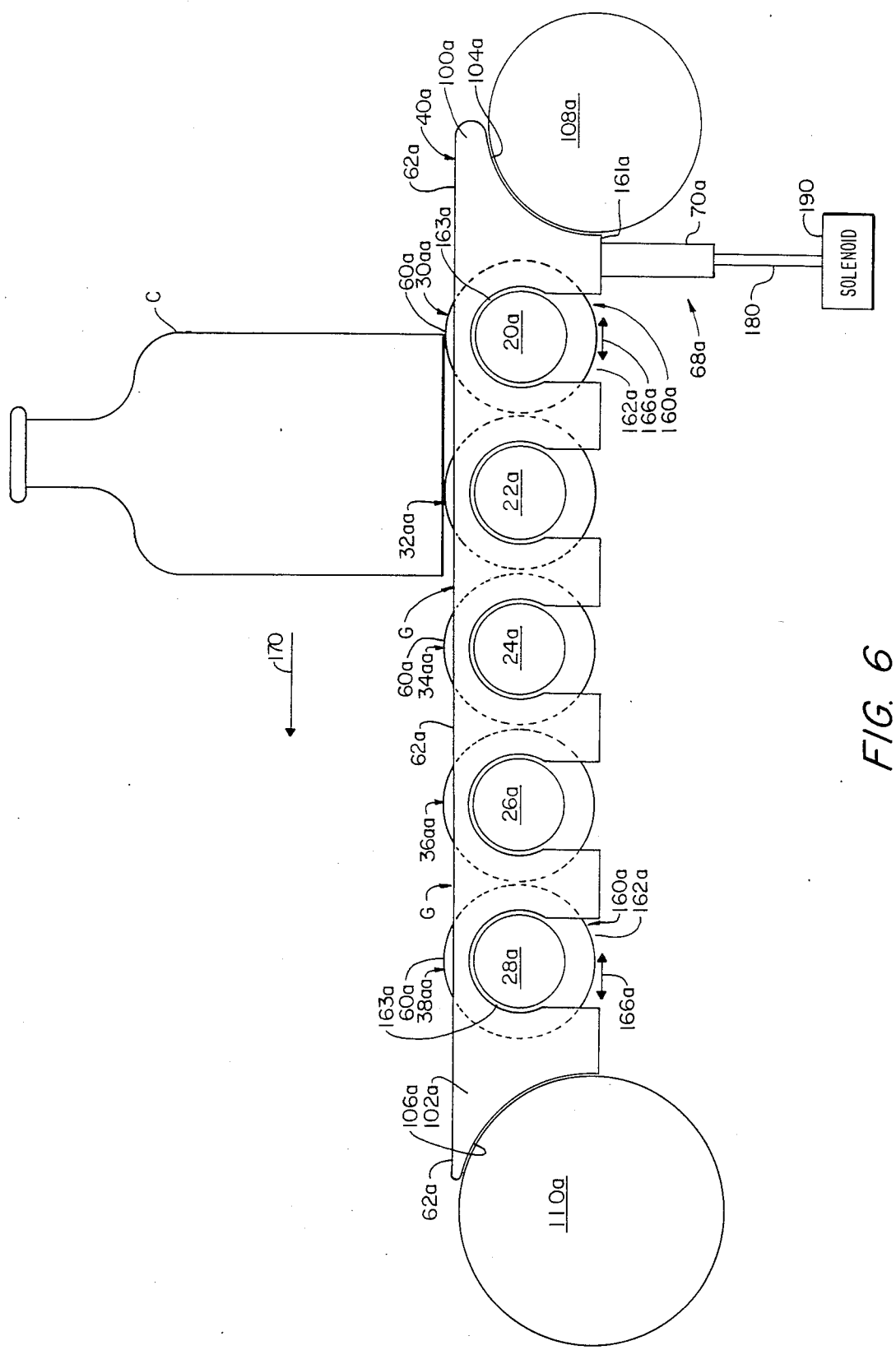
FIG. 6 is an elevational side view of the comb element mounted to successive rows of roller rods.

A preferred comb element 40a, FIG. 5, includes recesses 160a disposed in the lower edge 161a thereof. Each recess 57a includes a relatively narrow entrance 162a and an enlarged, generally circular cross-sectional section 163a. Element 40a is composed of a resilient material so that by bending the element and expanding entrances 162a in the direction of double-headed arrows 166a, comb element 40a may be mounted (e.g., snap fit) onto a plurality of excessive roller rods 20a through 28a as shown in FIG. 6. In particular, each rod extends through a respective enlarged section 163a which generally conforms to the shape of the received rod. Because the rods 20a through 28a have a larger diameter than the width of the respective entrances 162a in the element's relaxed condition, the comb element 40a is secured to the rods and will not be dislodged from them as the rods are driven. However, because the comb elements are resilient and the entrances 162a may be widened in the direction of arrows 166a, the comb elements can be readily removed from the rods for replacement or use elsewhere in the conveyor.

Comb elements 40a are disposed in the manner shown in FIG. 6 along successive roller rods between each adjacent pair of rollers. The upper surfaces 60a of rollers 30aa through 38aa extend slightly above the upper edges 62a of the comb elements. Upper edge 62a itself extends beyond the end rollers 30aa and 38aa on either end of the conveyor. These overhanging ends 100a and 102a are curved as at 104a and 106a to conform to the interfacing rollers 108a, 110a of neighboring conveyors.

In operation container C is driven in the direction of arrow 170 over the upper surfaces 60a of rollers 30aa through 38aa (and additionally rollers 30bb–hh through 38bb–hh which are not shown). As the container encounters the gaps G between the rollers on successive rods it may if it starts to tilt engage the slidable upper surface 62a of the comb elements. Container C thus slides unimpeded along the upper surface 62a and is able to maintain a generally upright position. It is not caught between the rollers or tipped over. Conveyor blockage and product damage are prevented.

Figure 7:
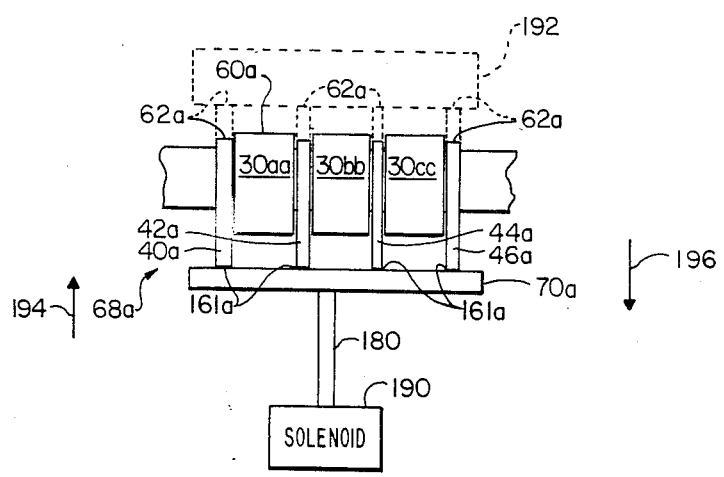
FIG. 7 is a simplified elevational front view of the comb structure being raised to brake a conveyed object.

To brake conveyor operation a support member 70a, FIGS. 6 and 7, is connected integrally or by attachment means such as welding, adhesives or fasteners to lower edges 161a of respective side-by-side comb elements 40a through 46a to form a unitary truss 68a. Truss 68a is selectively raised and lowered by an actuating member 180 which is itself operated by a solenoid 190. To brake conveyance of a package 192, FIG. 7, solenoid 190 is operated to raise truss 68a in the direction of arrow 194. Comb elements 40a through 46a are thereby raised so that their upper edges 62a extend above the upper surfaces 60a of the rollers (e.g., rollers 30aa–30cc). The conveyed product 192 engages only the upper edges 62a of the comb elements and not the upper surfaces 60a of the rollers. The conveyor's operation is thereby braked. Conveyance may be resumed simply by lowering truss 68a in the direction of arrow 196 to return comb elements 40a–46a to their initial position with their upper edges 62a below the upper surfaces 60a of the rollers.

In embodiments employing additional rollers, e.g., 30dd–30hh, not shown, and comb elements, e.g., 48a–54a, not shown, member 70a may be extended and attached to each of the comb elements so that each element is raised during the braking operation.

Although specific features of the invention are shown in some drawings and not others this is for convenience only as each feature may be combined with any or all of the other features in accordance with the invention.

Other embodiments will occur to those skilled in the art and are within the following claims.

What is claimed is:

1. A stabilized roller conveyor comprising:
   a plurality of spaced generally parallel roller rods;
   a number of rollers mounted on each of said rods and defining an upper surface for engaging conveyed objects; and
   a comb structure including a plurality of comb elements extending longitudinally along the conveyor transverse to said rods, one said comb element being disposed between each pair of adjacent rollers on each of at least two successive rods, each element having a plurality of recesses disposed in a lower longitudinal edge thereof for receiving a plurality of successive rods and a substantially level upper longitudinal edge extending upwardly above said rods and beneath the upper surface defined by said rollers; and further including means for selectively raising said comb element to at least the level of the upper surface defined by said rollers to brake items conveyed thereon.

2. The roller conveyor of claim 1 in which said comb element extends downwardly beneath the lower surfaces of said rollers.

3. The roller conveyor of claim 2 in which said comb structure includes support means beneath said rollers for interconnecting at least some of said comb elements to form a unitary truss.

4. The roller conveyor of claim 1 in which there is a comb element between each pair of adjacent roller.

5. The roller conveyor of claim 1 in which said roller rods are rotatably driven.

6. The roller conveyor of claim 5 in which said rollers loosely frictionally engage said roller rods.

7. The roller conveyor of claim 1 in which said upper edges of said comb elements include slide surfaces for slidingly supporting conveyed objects which bear on them between the rollers.

8. The roller conveyor of claim 1 in which the upper edges of said comb elements extend beyond the end roller of the conveyor.

9. The roller conveyor of claim 1 in which the ends of said comb elements are curved to conform generally to the ends of a neighboring conveyor.

10. The roller conveyor of claim 1 in which said recess includes an enlarged section for receiving a roller rod and an entrance which is narrower than the diameter of said rod.

11. The roller conveyor of claim 1 in which said comb element includes resilient material which is expandable to widen the entrance of said recess for inserting and removing said roller rod.

12. A stabilized roller conveyor comprising:
   a plurality of spaced generally parallel roller rods;
   a number of rollers mounted on each of said rods and defining an upper surface for engaging conveyed objects;
   a comb structure including a number of comb elements extending longitudinally along the conveyor transverse to said rods between each pair of adjacent rollers on each of at least two successive rods, each element having a plurality of recesses disposed in a lower longitudinal edge thereof for receiving a plurality of successive rods and a substantially level upper longitudinal edge extending upwardly above said rods and beneath the upper surface defined by said rollers, said comb element extending downwardly beneath the lower surfaces of said rollers and said comb structure further including support means beneath said rollers for interconnecting at least some of said comb elements to form a unitary truss, the ends of said comb elements being curved to conform to and extend above interfacing roller surfaces of neighboring conveyors; and
   means for selectively raising said comb elements at least the level of the upper surface defined by said rollers to brake items conveyed thereon.

* * * * *